(12) United States Patent
Miyatani (10) Patent No.: US 8,488,653 B2
(45) Date of Patent: Jul. 16, 2013

(54) COOPERATIVE COMMUNICATION SYSTEM AND METHOD USING THE SAME

(75) Inventor: Tetsuhiko Miyatani, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 1307 days.

(21) Appl. No.: 12/253,670

(22) Filed: Oct. 17, 2008

(65) Prior Publication Data

US 2009/0196332 A1    Aug. 6, 2009

(30) Foreign Application Priority Data

Feb. 4, 2008   (JP) .............................. 2008-00024513
Mar. 25, 2008   (KR) ........................ 10-2008-0027586

(51) Int. Cl.
*H03K 11/00*   (2006.01)
*H04L 25/60*   (2006.01)
*H04L 25/64*   (2006.01)

(52) U.S. Cl.
USPC ............................................ 375/214

(58) Field of Classification Search
USPC ............................................ 375/214
See application file for complete search history.

(56) References Cited

U.S. PATENT DOCUMENTS

2008/0043817 A1* 2/2008 Beems Hart et al. ......... 375/135
2010/0091697 A1* 4/2010 Vucetic et al. ................ 370/315
2010/0278136 A1* 11/2010 Oyman et al. ................ 370/330

* cited by examiner

*Primary Examiner* — Chieh M Fan
*Assistant Examiner* — Tanmay Shah
(74) *Attorney, Agent, or Firm* — NSIP Law

(57) ABSTRACT

A cooperative communication system and method is provided. A cooperative communication relay station includes a signal receiving unit which receives a source signal from a source node and a multiple relaying signal relayed by a neighboring relay station, a signal generation unit which generates a first relay signal and a second relay signal, the first relay signal being generated by performing a decode-and forward scheme with respect to the multiple relaying signal and the second relay signal being generated by performing an amplify-and-forward scheme with respect to the source signal, and a signal transmission unit which transmits the first relay signal and the second relay signal to a destination node.

13 Claims, 6 Drawing Sheets

//COOPERATIVE COMMUNICATION SYSTEM
COOPERATIVE COMMUNICATION SYSTEM AND METHOD USING THE SAME

CROSS-REFERENCE TO RELATED APPLICATIONS

This application claims the benefit under 35 U.S.C. §119 (a) of a Japanese Patent Application No. 2008-0024513, filed on Feb. 4, 2008 in the Japanese Patent Office, and of a Korean Patent Application No. 2008-0027586, filed on Mar. 25, 2008 in the Korean Intellectual Property Office, the disclosures of which are incorporated herein by reference in their entirety.

TECHNICAL FIELD

The following description relates to a cooperative communication system, and more particularly, to a cooperative communication technique where a base station, a relay station, and a terminal cooperatively communicate with each other.

BACKGROUND

A cooperative communication scheme has been provided in a wireless communication system to obtain a spatial diversity gain. According to a cooperative communication scheme, a plurality of nodes may virtually share antennas of other nodes to obtain a spatial diversity gain.

In general, a cooperative communication system includes a source node, a relay node, and a destination node. A relay node generates a relay signal corresponding to a source signal of a source node, and the relay node cooperates with the source node to transmit the source signal and relay signal to a destination node. In such a case, a cooperative diversity gain may be obtained in the destination node.

However, channel state information (CSI) regarding a channel formed between a relay station and a base station may be needed to obtain a cooperative diversity gain. Where a space-time block coding (STBC) scheme is used, although a CSI may not be required, at least two relay stations may be needed. Accordingly, a throughput of a communication system may be reduced to some extent to obtain the cooperative diversity gain.

Currently, a research is being conducted regarding a decode-and-forward scheme. In general, a communication system using a decode-and-forward scheme includes multiple relays. In this case, a source signal transmitted from a source node is transmitted to a destination node via the multiple relays. That is, any one of the relay stations generates a new relay signal by performing the decode-and-forward scheme with respect to a multiple relay signal relayed by a neighboring relay station, and transmits the generated new relay signal to another relay station or a destination node.

SUMMARY

In one general aspect, a cooperative communication relay station comprises a signal receiving unit which receives a source signal from a source node and a multiple relaying signal relayed by a neighboring relay station, a signal generation unit which generates a first relay signal and a second relay signal, the first relay signal being generated by performing a decode- and forward scheme with respect to the multiple relaying signal and the second relay signal being generated by performing an amplify-and-forward scheme with respect to the source signal, and a signal transmission unit which transmits the first relay signal and the second relay signal to a destination node.

The second relay signal and the source signal may have relations to achieve a cooperative diversity.

The signal generation unit may generate the first relay signal with a radio frequency band, the band being different from a band of the multiple relaying signal.

The signal generation unit may simultaneously generates the first and second relay signals.

The source node may correspond to a terminal, and the destination node may correspond to a base station.

In another general aspect, a receiver comprises a signal receiving unit which receives a source signal from a source node and relay signals including a first relay signal and a second relay signal from a relay station, a detector which detects a first symbol corresponding to the first relay signal from the relay signals, an extraction unit which extracts the second relay signal from the relay signals using the first symbol, and errors corrector which corrects an error in a signal being generated by adding the source signal and the second relay signal, and to correct an error in the first symbol.

The first relay signal may be generated by the relay station by performing a decode-and forward scheme with respect to a multiple relaying signal relayed by a neighboring relay station, and the second relay signal may be generated by the relay station by performing an amplify-and-forward scheme with respect to the source signal.

The detector may detect the first symbol using a maximum likelihood detection (MLD) scheme.

The signal receiving unit may perform reception-beamforming with respect to the relay signals and the source signal so that the relay signals and the source signal are distinguished from each other.

In still another general aspect, a cooperative communication relay method comprises receiving a source signal from a source node and a multiple relaying signal relayed by a neighboring relay station, generating a first relay signal and a second relay signal, the first relay signal being generated by performing a decode-and forward scheme with respect to the multiple relaying signal and the second relay signal being generated by performing an amplify-and-forward scheme with respect to the source signal, and transmitting the first relay signal and the second relay signal to a destination node.

The second relay signal and the source signal may have relations to achieve a cooperative diversity.

The generating of the first and second relaying signals may comprise simultaneously generating the first and second relay signals.

In yet another general aspect, a signal receiving method comprises receiving a source signal from a source node and relay signals including a first relay signal and a second relay signal from a relay station, detecting a first symbol corresponding to the first relay signal from the relay signals, extracting the second relay signal from the relay signals using the first symbol, and correcting an error in a signal being generated by adding the source signal and the second relay signal, and correcting an error in the first symbol.

The first relay signal may be a signal generated by the replay station by performing a decode-and forward scheme with respect to a multiple relaying signal relayed by a neighboring relay station, and the second relay signal may be a signal generated by the replay station by performing an amplify-and-forward scheme with respect to the source signal.

The detecting of the first symbol may comprise detecting the first symbol using a maximum likelihood detection (MLD) scheme.

The receiving of the relay signals and the source signal may comprise performing reception-beamforming with respect to the relay signals and the source signal so that the relay signals are distinguished from the source signal.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

Figure 1:
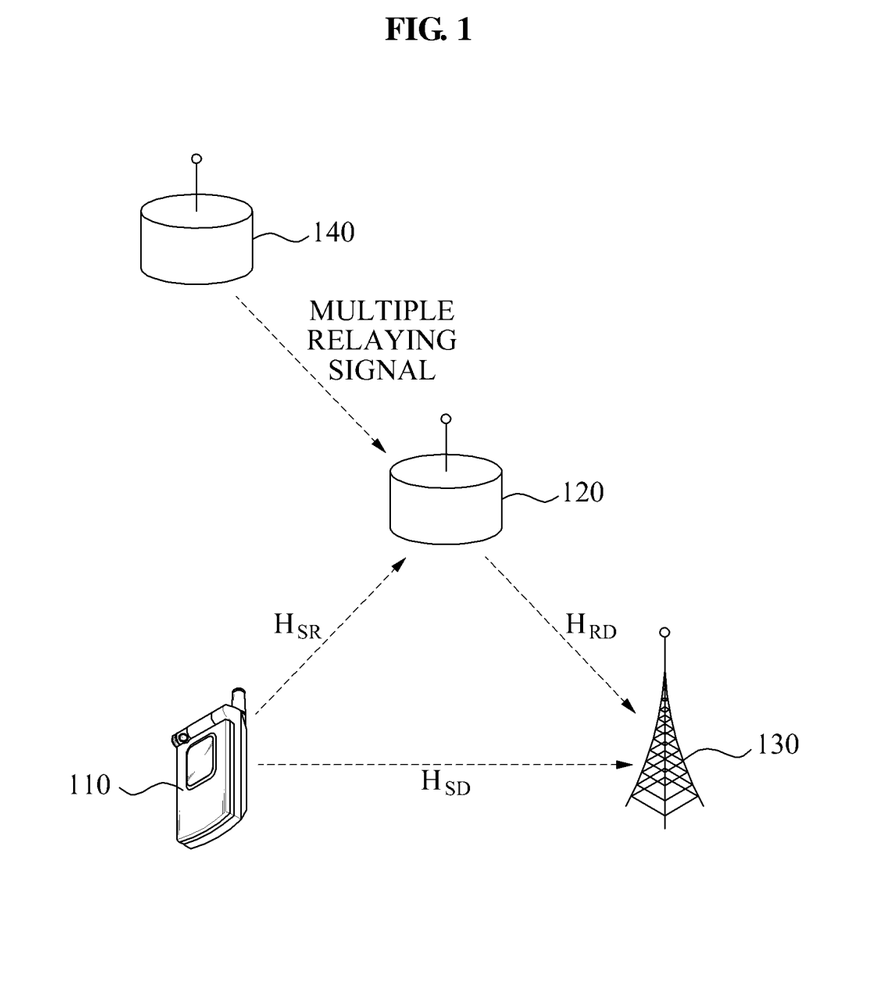
FIG. 1 is a diagram illustrating a cooperative communication system according to an exemplary embodiment.

FIG. 1 illustrates a cooperative communication system according to an exemplary embodiment.

Referring to FIG. 1, the cooperative communication system comprises a terminal 110, a relay station (1) 120, a base station 130, and a relay station (2) 140. In this case, where an uplink communication is performed, the terminal 110 may referred to a source node, the relay station (1) 120 may referred to a relay node, and the base station 130 may referred to a destination node.

Channels are formed between the terminal 110, the relay station (1) 120, and the base station 130. The relay station (1) 120 may be connected with the relay station (2) 140 via a wire/wireless. In this case, a channel formed between the terminal 110 and the relay station (1) 120 is $H_{SR}$, a channel formed between the terminal 110 and the base station 130 is $H_{SD}$, and a channel formed between the relay station (1) 120 and the base station 130 is $H_{RD}$.

The terminal 110, the relay station 1 120, and the base station 130 transmits/receives signals via the formed channels.

The relay station (1) 120 may receive a source signal transmitted from the terminal 110 via the channel $H_{SR}$. Also, the relay station (1) 120 may receive a multiple relaying signal transmitted from the relay station (2) 140. In this case, the multiple relaying signal is different from the source signal of the terminal, and may correspond to a signal of other terminals although it is not illustrated in FIG. 1. The relay station (1) 120 receives the source signal and multiple relaying signal.

The relay station (1) 120 may generate a relay signal by processing the source signal and the multiple relaying signal. For example, the relay station (1) 120 may generate a first relay signal by performing a decode-and forward scheme with respect to the multiple relaying signal, and generate a second relay signal by performing an amplify-and-forward scheme with respect to the source signal. The relay station (1) 120 may transmit the relay signals including the first and second relay signal to the base station 130.

The base station 130 may receive the relay signals from the relay station (1) 120 and the source signal from the terminal 110 via the channels $H_{RD}$ and $H_{SD}$. That is, since the base station 130 may receive the source signal and the second relay signal via independent channels, a cooperative diversity gain may be obtained. Also, the base station 130 may improve a throughput of the cooperative communication system by extracting the first relay signal from the relay signals.

Accordingly, a cooperative communication system according to an exemplary embodiment may obtain a cooperative diversity gain by using an amplify-and-forward scheme and improve a throughput by using a decode-and-forward scheme and the amplify-and-forward scheme.

Figure 2:
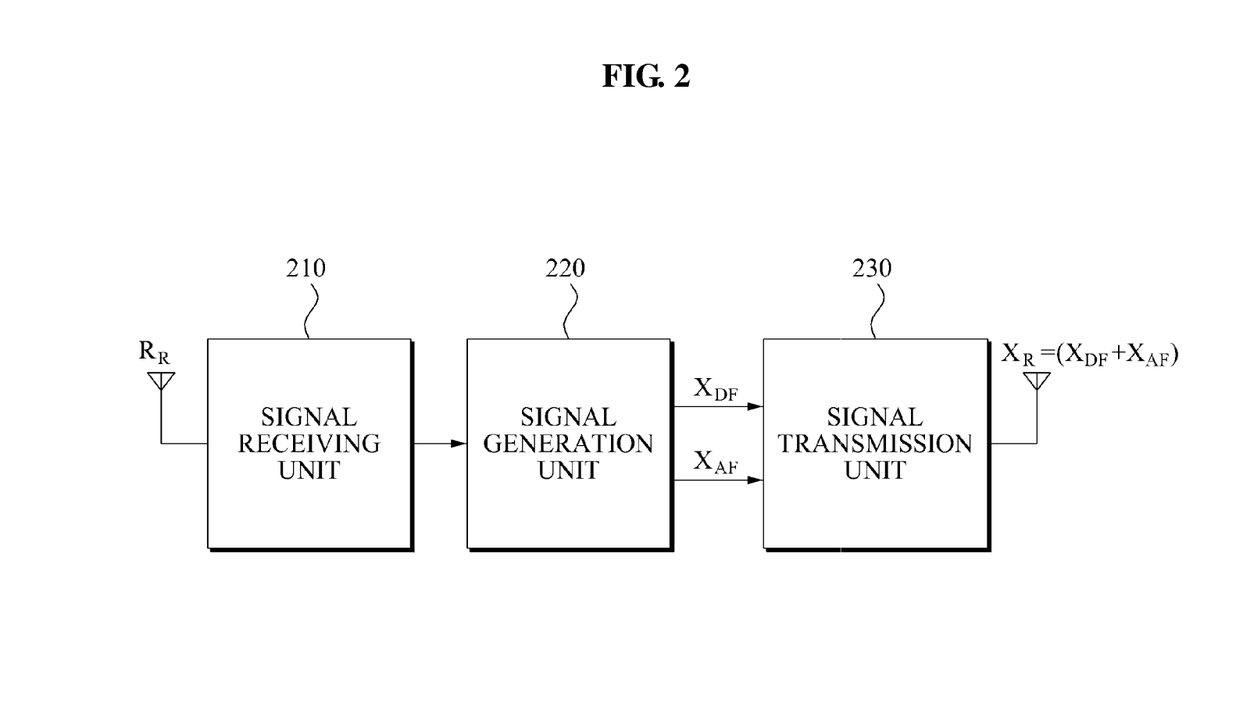
FIG. 2 is a block diagram illustrating a cooperative communication relay station according to an exemplary embodiment.

FIG. 2 illustrates a cooperative communication relay station according to an exemplary embodiment.

Referring to FIG. 2, the cooperative communication relay station comprises a signal receiving unit 210, a signal generation unit 220, and a signal transmission unit 230.

The signal receiving unit 210 receives a source signal $X_S$ transmitted from a source node and a multiple relaying signal relayed by a neighboring relay station. In this case, the source signal received in the signal receiving unit 210, $R_R$, may be represented by, $$R_R = H_{SR}X_S + N_R \qquad \text{[Equation 1]}$$

where $N_R$ indicates noise.

In the Equation 1, the received multiple relaying signal is not shown.

The signal generation unit 220 generates a first relay signal and a second relay signal utilizing the received source signal $R_R$ and the multiple relaying signal. In this case, the first relay signal $X_{DF}$ is a signal which is generated by decoding the multiple relaying signal according an decode-and-forward scheme, and the second relay signal $X_{AF}$ is a signal which is generated by amplifying a power of the source signal $X_S$. The second relay signal $X_{AF}$ may be generated by multiplying the received source signal $R_R$ by $H_{SR}^H$ and a power amplification coefficient $\sqrt{\rho_R}$, which may be represented by, $$X_{AF} = \sqrt{\rho_R}(|H_{SR}|^2 X_S + H_{SR}^H N_R) \qquad \text{[Equation 2]}$$

As an illustration, a terminal, a relay station, and a base station may receive/transmit signals according to an orthogonal frequency division modulation (OFDM) scheme. In this case, although it is not illustrated in FIG. 2, the signal generation unit 220 may include a fast Fourier transformer (FFT), an amplifier, a decoder, and an inverse FFT (IFFT).

Generally, a FFT transforms the received source signal $R_R$ and the multiple relaying signal to frequency domain signals since the received source signal $R_R$ and the multiple relaying signal are time domain signals.

In this case, an amplifier amplifies a power of the source signal, transformed into the frequency domain signal according to an amplify-and-forward scheme, and a decoder decodes the multiple relaying signal, transformed into the frequency domain signal according to the decode-and-forward scheme.

Also, an IFFT transforms the decoded signal and amplified signal to time domain signals to generate a first relay signal ($X_{DF}$) and a second relay signal ($X_{AF}$).

The signal transmission unit 230 may transmit a relay signal $X_{DF}+X_{AF}=X_R$ including the first relay signal $X_{DF}$ and the second relay signal $X_{AF}$ to a destination node. The signal transmission unit 230 may independently transmit the relay signal $X_R$ to the destination node with respect to the source node.

Where the signal transmission unit 230 transmits the relay signal $X_{DF}+X_{AF}=X_R$ including the first relay signal $X_{DF}$ and the second relay signal $X_{AF}$ to the destination node, and where the source node transmit the source signal $X_S$ to the destination node, the destination node may receive the source signal $X_S$ as well as the second relay signal $X_{AF}$ included in the relay signal $X_R$. Since the second relay signal $X_{AF}$ is generated by amplifying the power of the source signal $X_S$, the destination node may improve a throughput by extracting the first relay signal $X_{DF}$ from the relay signal $X_R$.

Figure 3:
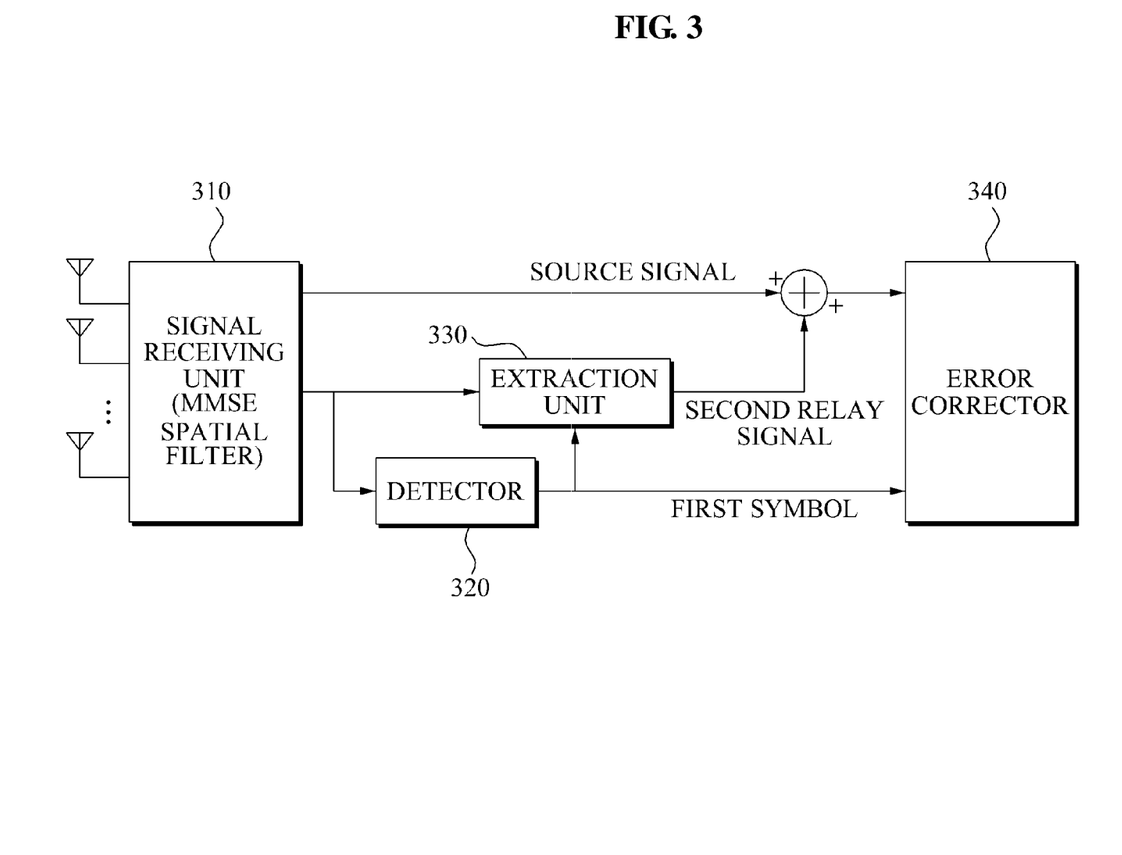
FIG. 3 is a block diagram illustrating a base station according to an exemplary embodiment.

FIG. 3 illustrates a base station according to an exemplary embodiment.

Referring to FIG. 3, the base station comprises a signal receiving unit 310, a detector 320, an extraction unit 330, and an error corrector 330.

The signal receiving unit 310 receives a relay signal $X_R$ from a relay station and a source signal $X_S$ from a source node.

In this case, a delay may occur during the course of generating the relay signal $X_R$ in a relay station. Therefore, a destination node, for example a base station, may initially receive the source signal $X_S$ prior to the relay signal $X_R$. In this case, the signal receiving unit 310 may distinguish the source signal $X_S$ from the relay signal $X_R$ without utilizing an additional filter.

Where the delay does not occur during the course of generating the relay signal in the relay station, or where the delay is relatively less, the relay signal $X_R$ and the source signal $X_S$ may not be distinguished from each other. Also, where a plurality of relay stations exist, a plurality of relay signals transmitted from the plurality of relay stations may not be distinguished from each other.

In this case, the signal receiving unit 310 may perform reception-beamforming utilizing a minimum mean square error (MMSE) spatial filter. Accordingly, the destination node may distinguish the relay signal $X_R$ from the source signal $X_S$.

Received signals in the signal receiving unit 310 may be represented by, $$Y = [H_{SD} \; H_{RD}]\begin{bmatrix} X_S \\ X_R \end{bmatrix} + \begin{bmatrix} n_{D1} \\ n_{D2} \end{bmatrix} \quad \text{[Equation 3]}$$

$$= [H_{SD} \; H_{RD}]\begin{bmatrix} X_S \\ X_{DF} + \sqrt{\rho_R}(|H_{SR}|^2 X_S' + H_{SR}^H N_R) \end{bmatrix} + \begin{bmatrix} n_{D1} \\ n_{D2} \end{bmatrix}$$

where $H_{SD}$ and $H_{RD}$ are column vectors, $X_S'$ is a delay of $X_S$, and $n_{D1}$ and $n_{D2}$ are noises in a base station, that is a destination node.

The detector 320 detects a first symbol corresponding to a first relay signal $X_{DF}$ from among relay signals. The detector 320 may detect the first symbol utilizing a maximum likelihood detection (MLD) scheme. In this case, the first relay signal is generated by performing s decode-and-forward scheme with respect to the multiple relaying signal.

The extraction unit 330 extracts the second relay signal $X_{AF}$ from the relay signal $X_R$ utilizing the first symbol. That is, the relay signal $X_R$ may be represented as $X_{DF}+\sqrt{\rho_R}(|H_{SR}|^2 X_S'+H_{SR}^H N_R)$, since the extraction unit 330 may recognize the first relay signal $X_{DF}$, thereby extracting the second relay signal $\sqrt{\rho_R}(|H_{SR}|^2 X_S'+H_{SR}^H N_R)$.

The error corrector 340 corrects an error in the first symbol and in a signal being generated by adding the second relay signal $X_{AF}$ and the source signal $X_S$. Therefore, a base station according to an exemplary embodiment may obtain a cooperative diversity gain by receiving the second relay signal $X_{AF}$ and the source signal $X_S$ via independent channels.

A base station according to an exemplary embodiment may improve a throughput by simultaneously processing the first relay signal $X_{DF}$ with the second relay signal $X_{AF}$ and the source signal $X_S$.

Figure 4:
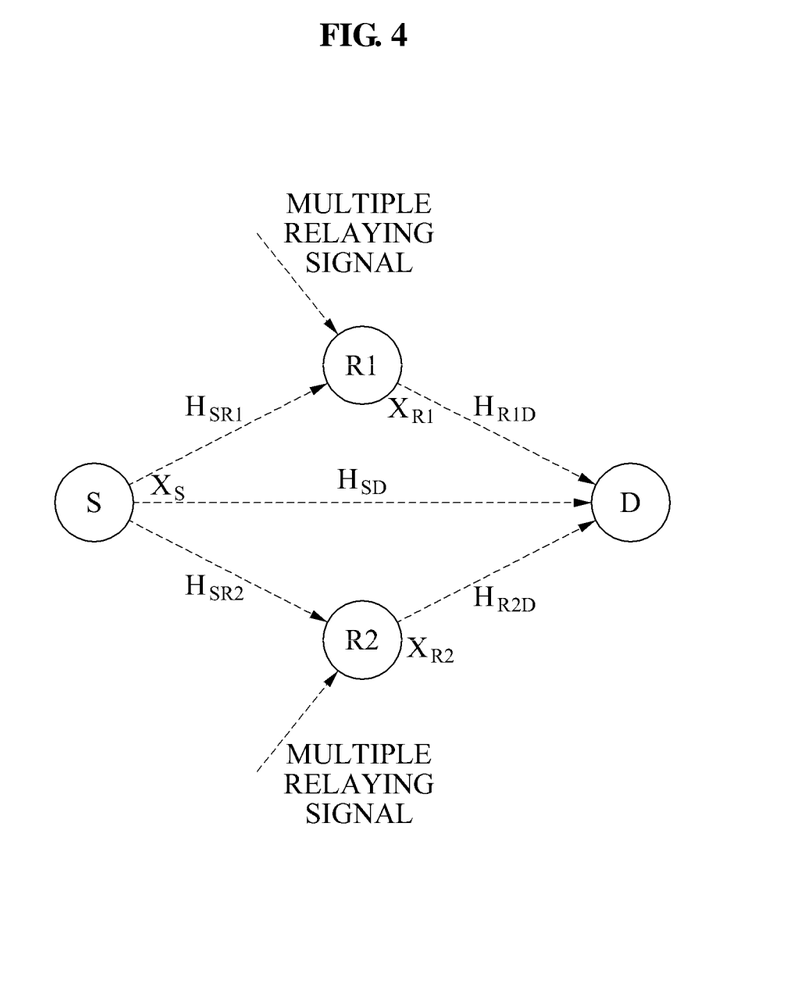
FIG. 4 is a diagram illustrating a cooperative communication system according to another exemplary embodiment.

FIG. 4 illustrates a cooperative communication system according to another exemplary embodiment.

Referring to FIG. 4, the cooperative communication system comprises two relay stations R1 and R2, a source node S, and a destination node D.

Channels $H_{SR1}$, $H_{SR2}$, $H_{R1D}$, $H_{R2D}$, and $H_{SD}$ are formed between the two relay stations R1 and R2, the source node D, and the destination node D. The relay stations R1 and R2 may receive a source signal $X_S$ transmitted from the source node S, and although it is not illustrated in FIG. 4, may receive multiple relaying signals from neighboring relay stations. Also, the relay stations R1 and R2 may generate relay signals by simultaneously applying an amplify-and-forward scheme and a decode-and-forward scheme with respect to the source signal $X_S$ and the multiple signals.

The relay stations R1 and R2 may transmit the generated relay signals to the destination node D. In this case, the source node S may independently transmit the source signal $X_S$ to the destination node D with respect to the relay stations R1 and R2.

Also, the destination node D may receive the source signal $X_S$ from the source node S and the relay signals from the relay stations R1 and R2. According to an exemplary embodiment, the destination node D accordingly detects the received signals, thereby improving a throughput and a cooperative diversity gain.

Figure 5:
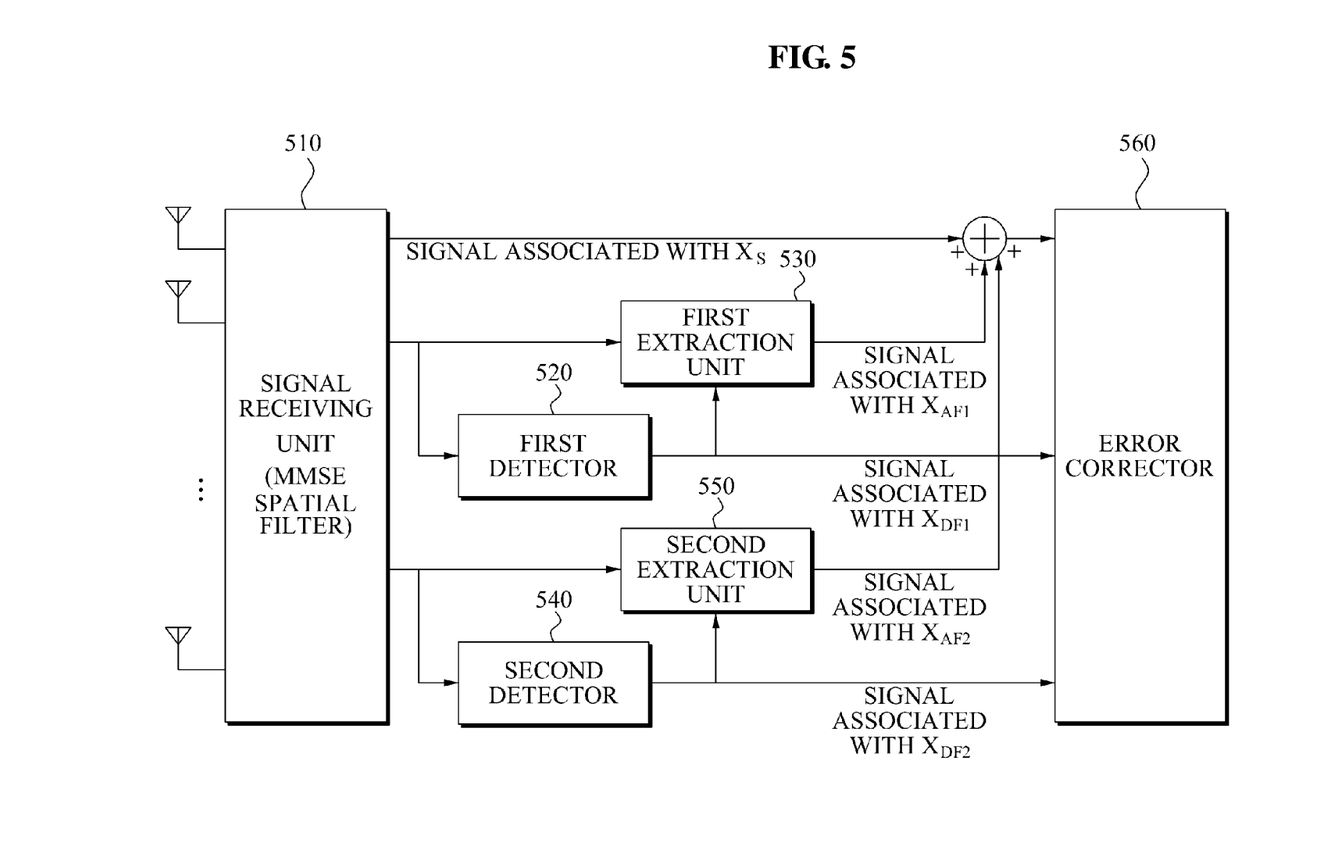
FIG. 5 is a block diagram illustrating a base station according to another exemplary embodiment.

FIG. 5 illustrates a base station according to another exemplary embodiment.

FIG. 5 conceptually illustrates a configuration of a base station in case that a cooperative communication system includes two relay stations as illustrated in FIG. 4.

Referring to FIG. 5, the base station comprises a signal receiving unit 510, a first detector 520, a first detector 530, a second detector 540, a second extraction unit 550, and an error corrector block 560.

The signal receiving unit 510 receives relay signals from relay stations R1 and R2 and a source signal from a source node S. In this case, relay signals of the relay station R1 include $X_{DF1}$ and $X_{AF1}=\sqrt{\rho_{R1}}(|H_{SR1}|^2 X_S'+H_{SR1}^H N_{R1})$, relay signals of the relay stations R2 include $X_{DF2}$ and $X_{AF2}=\sqrt{\rho_{R2}}(|H_{SR2}|^2 X_S'+H_{SR2}^H N_{R2})$.

In this case, a received signal Y in the destination node D may be represented by, $$Y = \begin{bmatrix} H_{SD} & H_{R1D} & H_{R2D} \end{bmatrix} \begin{bmatrix} X_S \\ X_{R1} \\ X_{R2} \end{bmatrix} + \begin{bmatrix} n_{D1} \\ n_{D2} \\ n_{D3} \end{bmatrix} \quad \text{[Equation 4]}$$

$$= \begin{bmatrix} H_{SD} & H_{R1D} & H_{R2D} \end{bmatrix}$$

$$\begin{bmatrix} X_S \\ X_{DF1} + \sqrt{\rho_{R1}} \left( |H_{SR1}|^2 X'_S + H^H_{SR1} N_{R1} \right) \\ X_{DF2} + \sqrt{\rho_{R2}} \left( |H_{SR2}|^2 X'_S + H^H_{SR2} N_{R2} \right) \end{bmatrix} + \begin{bmatrix} n_{D1} \\ n_{D2} \\ n_{D3} \end{bmatrix}.$$

The first detector 520 detects symbols corresponding to $X_{DF1}$ transmitted from the relay station R1, and the second detector 540 detects symbols corresponding to $X_{DF2}$ transmitted from the relay station R2.

The first extraction unit 530 extracts $\sqrt{\rho_{R1}}(|H_{SR1}|^2 X_S' + H_{SR1}^H N_{R1})$ utilizing symbols corresponding to $X_{DF1}$. Similarly, the second extraction unit 55 extracts $\sqrt{\rho_{R2}}(|H_{SR2}|^2 X_S' + H_{SR2}^H N_{R2})$.

Therefore, a signal associated with $X_{DF1}$, a signal associated with $X_{DF2}$, a signal which is generated by adding a signal associated with $X_S$, a signal associated with $X_{AF1}$, and a signal associated with $X_{AF2}$ are inputted to the error corrector block 560. The error corrector block 560 corrects errors in the signal associated with $X_{DF1}$, in the signal associated with $X_{DF2}$, in the signal which is generated by adding the signal associated with $X_S$, the signal associated with $X_{AF1}$, and the signal associated with $X_{AF2}$.

Accordingly, a base station according to an exemplary embodiment may effectively receive and detect a plurality of signals even where a plurality of relay stations exist.

Figure 6:
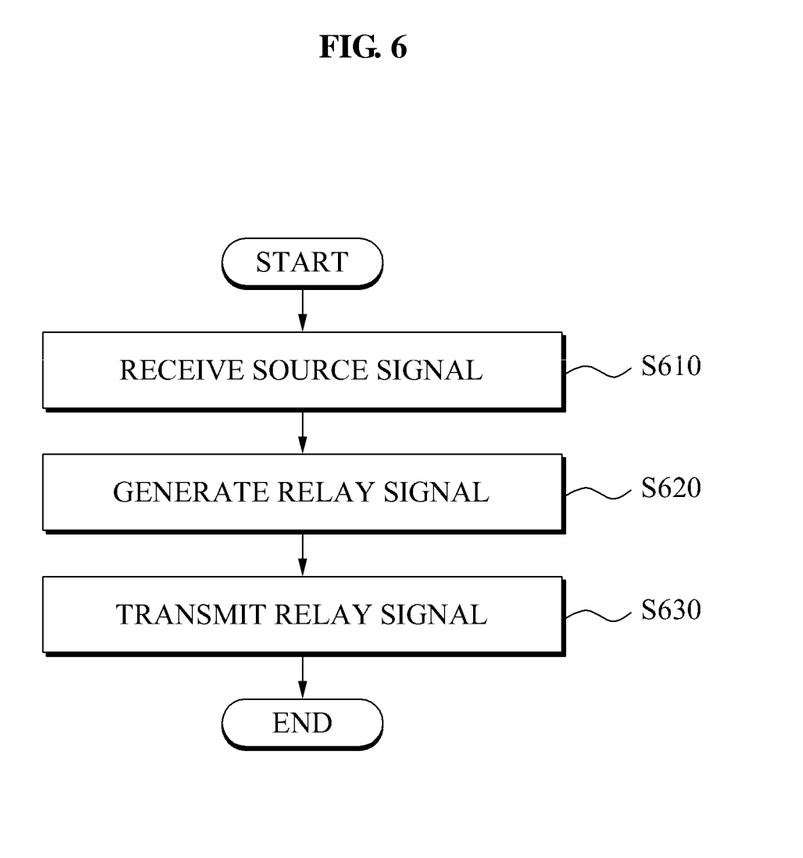
FIG. 6 is a flowchart illustrating operations of a cooperative communication method according to an exemplary embodiment.

FIG. 6 is a flowchart illustrating operations of a cooperative communication method according to an exemplary embodiment.

Referring to FIG. 6, a cooperative communication relay station according to an exemplary embodiment receives a source signal transmitted from a source node and a multiple relaying signal relayed by a neighboring adjacent relay station in operation S610.

In operation S620, the cooperative communication relay station generates a first relay signal and a second relay signal, the first relay signal being generated by performing a decode-and-forward scheme with respect to the multiple relaying signal and the second relay signal being generated by performing an amplify-and forward scheme with respect to the source signal.

In operation S630, the cooperative communication relay station transmits the relay signals including the first and second relay signal to a destination node.

Although not illustrated in FIG. 6, the signal receiving method according to an exemplary embodiment may comprise operations of receiving the source signal from the source node and the relay signals including the first and the second relay signal from the relay station, detecting a first symbol corresponding to the first relay signal from the relay signals, extracting the second relay signal from the relay signals utilizing the first symbol, and correcting an error in a signal being generated by adding the source signal and the second relay signal and correcting an error in the first symbol.

The above-described methods including an exemplary a cooperative communication relay method and a signal receiving method may be recorded, stored, or fixed in one or more computer-readable media that includes program instructions to be implemented by a computer to cause a processor to execute or perform the program instructions. The media may also include, independent or in combination with the program instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the methods and/or operations described above.

According to certain embodiments described above, a cooperative communication system may utilize both a decode-and-forward scheme for improving a throughput of a communication system and an amplify-and-forward scheme for obtaining a cooperative diversity.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cooperative communication relay station, the relay station comprising:
   a signal receiving unit configured to receive a source signal from a source node and a multiple relaying signal relayed by a neighboring relay station;
   a signal generation unit configured to simultaneously generate a first relay signal and a second relay signal, the first relay signal being generated by performing a decode-and forward scheme with respect to the multiple relaying signal and the second relay signal being generated by performing an amplify-and-forward scheme with respect to the source signal; and
   a signal transmission unit configured to transmit the first relay signal and the second relay signal to a destination node.

2. The cooperative communication relay station of claim 1, wherein the second relay signal and the source signal have relations to achieve a cooperative diversity.

3. The cooperative communication relay station of claim 1, wherein the signal generation unit generates the first relay signal with a radio frequency band, the band being different from a band of the multiple relaying signal.

4. The cooperative communication relay station of claim 1, wherein the source node corresponds to a terminal, and the destination node corresponds to a base station.

5. A receiver, comprising:
   a signal receiving unit configured to receive a source signal from a source node and relay signals comprising a first relay signal and a second relay signal from a relay station;
   a detector configured to detect a first symbol corresponding to the first relay signal from the relay signals;
   an extraction unit configured to extract the second relay signal from the relay signals using the first symbol; and
   an error corrector configured to correct an error in a signal being generated by adding the source signal and the second relay signal, and to correct an error in the first symbol, wherein the first relay signal is generated by the relay station by performing a decode-and forward scheme with respect to a multiple relaying signal relayed by a neighboring relay station, and the second relay signal is generated by the relay station by performing an amplify-and-forward scheme with respect to the source signal.

6. The receiver of claim 5, wherein the detector detects the first symbol using a maximum likelihood detection (MLD) scheme.

7. The receiver of claim 5, wherein the signal receiving unit performs reception-beamforming with respect to the relay signals and the source signal so that the relay signals and the source signal are distinguished from each other.

8. A cooperative communication relay method, the method comprising:
   receiving a source signal from a source node and a multiple relaying signal relayed by a neighboring relay station;
   generating simultaneously a first relay signal and a second relay signal, the first relay signal being generated by performing a decode-and forward scheme with respect to the multiple relaying signal and the second relay signal being generated by performing an amplify-and-forward scheme with respect to the source signal; and
   transmitting the first relay signal and the second relay signal to a destination node.

9. The method of claim 8, wherein the second relay signal and the source signal have relations to achieve a cooperative diversity.

10. A signal receiving method, comprising:
    receiving a source signal from a source node and relay signals comprising a first relay signal and a second relay signal from a relay station;
    detecting a first symbol corresponding to the first relay signal from the relay signals;
    extracting the second relay signal from the relay signals using the first symbol; and
    correcting an error in a signal being generated by adding the source signal and the second relay signal, and correcting an error in the first symbol,
    wherein the first relay signal is a signal generated by the replay station by performing a decode-and forward scheme with respect to a multiple relaying signal relayed by a neighboring relay station, and the second relay signal is a signal generated by the replay station by performing an amplify-and-forward scheme with respect to the source signal.

11. The method of claim 10, wherein the detecting of the first symbol comprises detecting the first symbol using a maximum likelihood detection (MLD) scheme.

12. The method of claim 10, wherein the receiving of the relay signals and the source signal comprises performing reception-beamforming with respect to the relay signals and the source signal so that the relay signals are distinguished from the source signal.

13. A non-transitory computer-readable storage medium storing a program for implementing a cooperative communication relay method, comprising instructions to cause a computer to:
    receive a source signal from a source node and a multiple relaying signal relayed by a neighboring relay station;
    generate simultaneously a first relay signal and a second relay signal, the first relay signal being generated by performing a decode-and forward scheme with respect to the multiple relaying signal and the second relay signal being generated by performing an amplify-and-forward scheme with respect to the source signal; and
    transmit the first relay signal and the second relay signal to a destination node.

* * * * *